(12) United States Patent
Ciminelli et al.

(10) Patent No.: US 11,353,659 B2
(45) Date of Patent: Jun. 7, 2022

(54) PHOTONIC CHIP FEATURES FOR FIBER ATTACHMENT

(71) Applicants: Mario J. Ciminelli, Rochester, NY (US); Stefan Preble, Pittsford, NY (US); Jeffrey Steidle, Geneseo, NY (US); Paul Thomas, Pittsford, NY (US)

(72) Inventors: Mario J. Ciminelli, Rochester, NY (US); Stefan Preble, Pittsford, NY (US); Jeffrey Steidle, Geneseo, NY (US); Paul Thomas, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 16/834,179

(22) Filed: Mar. 30, 2020

(65) Prior Publication Data
US 2020/0310034 A1 Oct. 1, 2020

Related U.S. Application Data

(60) Provisional application No. 62/826,483, filed on Mar. 29, 2019, provisional application No. 62/826,400, filed on Mar. 29, 2019.

(51) Int. Cl.
*G02B 6/26* (2006.01)

(52) U.S. Cl.
CPC ...................... *G02B 6/26* (2013.01)

(58) Field of Classification Search
CPC ....... G02B 6/30; G02B 6/3652; G02B 6/3256
See application file for complete search history.

(56) References Cited

U.S. PATENT DOCUMENTS 5,046,808 A * 9/1991 Chang .................. H01S 3/06704
385/13
8,180,189 B2 5/2012 Okubo et al.
(Continued)

FOREIGN PATENT DOCUMENTS

WO 2016036734 A1 3/2016
WO 2016196035 A1 12/2016

OTHER PUBLICATIONS

Son, Gyeongho, et al.; High-efficiency broadband light coupling between optical fibers and photonic integrated circuits, De Gruyter Nanophotonics 2018, pp. 1-20.
(Continued)

*Primary Examiner* — Eric Wong
(74) *Attorney, Agent, or Firm* — Bond Schoeneck & King, PLLC; Joseph M. Noto

(57) ABSTRACT

A photonic chip including a trench at the periphery of the photonic chip forming a recessed rim, wherein the recessed rim includes at least one geometric feature separating a plurality of waveguide locations, the at least one geometric feature suitable to prevent adhesive flow between the plurality of waveguide locations and method for preventing adhesive flow from interfering with bonding of optical fibers to the photonic chip is disclosed. A photonic chip including at least one optical fiber groove which includes an entrance portion and a non-entrance portion, wherein the entrance portion includes a flared opening having a greater clearance than the non-entrance portion and method for attaching an optical fiber to the photonic chip minimizing damage to at least one of the optical fiber and the photonic chip is disclosed.

17 Claims, 26 Drawing Sheets

(56) References Cited

U.S. PATENT DOCUMENTS

| | | |
|---|---|---|
| 8,254,737 B2 | 8/2012 | Choudhury et al. |
| 9,461,442 B2 | 10/2016 | Shahine |
| 9,588,416 B2 | 3/2017 | Englund et al. |
| 9,638,859 B1 | 5/2017 | Nuttall et al. |
| 9,995,881 B1* | 6/2018 | Patel ................. G02B 6/30 |
| 10,197,733 B2 | 2/2019 | Pan et al. |
| 10,514,506 B2 | 12/2019 | Brusberg et al. |
| 10,852,492 B1* | 12/2020 | Vermeulen ......... G02B 6/12002 |
| 10,962,720 B2* | 3/2021 | Lipson ............... G02B 6/305 |
| 2002/0118925 A1* | 8/2002 | Matsumoto .......... G02B 6/32 385/52 |
| 2005/0031291 A1* | 2/2005 | Gao ..................... G02B 6/423 385/142 |
| 2015/0063747 A1* | 3/2015 | Chen ................... G02B 6/3636 385/14 |
| 2015/0331212 A1* | 11/2015 | Contag ............... G02B 6/4292 385/14 |
| 2017/0097470 A1 | 4/2017 | Jiang |
| 2017/0343747 A1* | 11/2017 | Giziewicz ........... G02B 6/428 |
| 2017/0351031 A1* | 12/2017 | Shastri ............... G02B 6/30 |
| 2018/0172909 A1* | 6/2018 | Asghari ............. G02B 6/1228 |
| 2018/0321444 A1* | 11/2018 | Wyss ................. G02B 6/305 |

OTHER PUBLICATIONS

Sethi, Purnima, et al.; Ultra-Compact Low-loss Broadband Wavelengeth Taper in Silicon-on-Insulator, May 2017, https://www.researchgate.net/publication/316679905_Ultra-compact_low-loss_broadband_waveguide_taper_in_silicon-on-insulator/link/591972e84585159b1a49d77b/download, 9 pages.

Finn, Andreas, Direct Patterning of Optical Coupling Devices in Polymer Waveguides, Feb. 2014, https://tud.qucosa.de/api/qucosa%3A28066/attachment/ATT-0/, 157 pages.

He, Lingyan, et al, Low-loss fiber-to-chip interface for lithium niobate photonic integrated circuits, Feb. 26, 2019, https://arxiv.org/pdf/1902.08969.pdf; pp. 1-5.

Liao, Chun-Wei, et al., Design and fabrication of large fiber-mode-matched three-dimensional adiabatic tapered couplers for integrated optics, International Conference on Optical MEMS and Nanophotonics, Aug. 2010, pp. 145-146.

* cited by examiner

PHOTONIC CHIP FEATURES FOR FIBER ATTACHMENT

CROSS REFERENCE

This application claims the benefit of the filing date of U.S. Provisional Patent Application Ser. No. 62/826,400 and U.S. Provisional Patent Application Ser. No. 62/826,483, both filed Mar. 23, 2019, which are hereby incorporated by reference in their entirety.

This invention was made with government support under 15-2-5220/B8 awarded by AIM Photonics-DoD/Research Foundation of. The government has certain rights in the invention.

FIELD

The present disclosure relates to photonic chip features for prevention of adhesive spread and photonic chip features for fiber attachment into grooves, and in particular to methods and products relating thereto.

BACKGROUND

A photonic integrated circuit (PIC) die processes photons versus electrons in an integrated circuit (IC) that are ubiquitous in our world. After singulating the die from a wafer, the die is placed into a package (typically ceramic or low thermal coefficient metal) or in some cases directly onto a PCB by a thermally cured die attach adhesive after precise placement. In the current IC manufacturing environment based on electrical signal manipulation, this is where the IC die is wire bonded to various packaging formats to interface to the outside environment. Various IC packaging methods exist for interfacing the electrical signals on the die. With a PIC die, the equivalent connection is with optical fibers and or optical fiber arrays. These delicate fibers need to be precisely positioned to optical waveguides on the die and attached in a robust method. The method of attachment must both prevent damage to the fiber and maintain efficient power coupling of the signal to the optical circuit. Two approaches typically used are edge coupling and surface gratings. Surface gratings have a bit more forgiveness in position but require more area of the die surface.

As a part of the wafer manufacturing process used to create the photonic chips, a trench is sometimes etched around the periphery of Silicon Photonic chips which creates a recessed rim once the chips are diced. This is done to prevent the waveguides that extend to the edge of the chips from being damaged when the Silicon wafers are diced. Fibers and/or fiber arrays are used to couple light from the fibers to the waveguides on the chip. This is done by bringing the fibers and/or fiber arrays up to the edge of the chip, aligning them to the waveguides and then adhesively bonding them to the chip. During the bonding process the adhesive spreads along the edge and the recessed rim of the chip, which prevents additional fibers from being properly aligned with the waveguide.

In the edge coupling approach, numerous implementations exist in research. These include active alignment with no constraints, to grooves (V shaped, U shaped, etc.) with very precise dimensions which have been etched into the chip targeting a more cost-effective passive alignment approach.

The etched grooves provide precisely sized channels that cradle the fibers and/or fiber arrays precisely. The groove width and depth are typically sized so that there is only 1-2 microns of clearance on both sides and below the fiber. In the prior art the grooves have straight edges along their entire length. Because there is little clearance between the fiber and the groove edges, the fiber and/or the chip are easily damaged when the fiber is inserted into the groove.

SUMMARY

In accordance with one aspect of the present disclosure, there is provided a method for attaching an optical fiber to a photonic chip, including:
bringing a plurality of optical fibers to an edge of a photonic chip including a trench at the periphery of the photonic chip forming a recessed rim, wherein the recessed rim includes at least one geometric feature separating a plurality of waveguide locations;
aligning a first one of the plurality of optical fibers to a first one of the plurality of waveguide locations; and
adhesively bonding the first one of the plurality of optical fibers to the photonic chip with adhesive, wherein adhesive flow along the recessed rim of the photonic chip is prevented by the at least one geometric feature from interfering with the attachment of a second one of the plurality of optical fibers.

In accordance with another aspect of the present disclosure, there is provided a photonic chip including: a trench at the periphery of the photonic chip forming a recessed rim, wherein the recessed rim includes at least one geometric feature separating a plurality of waveguide locations, the at least one geometric feature suitable to prevent adhesive flow between the plurality of waveguide locations.

In accordance with another aspect of the present disclosure, there is provided a method for attaching an optical fiber to a photonic chip, including inserting an end of an optical fiber into an optical fiber groove of a photonic chip by guiding the end of the optical fiber into a flared opening of an entrance portion of the optical fiber groove, thereby minimizing damage to at least one of the optical fiber and the photonic chip.

In accordance with another aspect of the present disclosure, there is provided a photonic chip including at least one optical fiber groove which includes an entrance portion and a non-entrance portion, wherein the entrance portion includes a flared opening having a greater clearance than the non-entrance portion.

These and other aspects of the present disclosure will become apparent upon a review of the following detailed description and the claims appended thereto.

DETAILED DESCRIPTION

Figure 1:
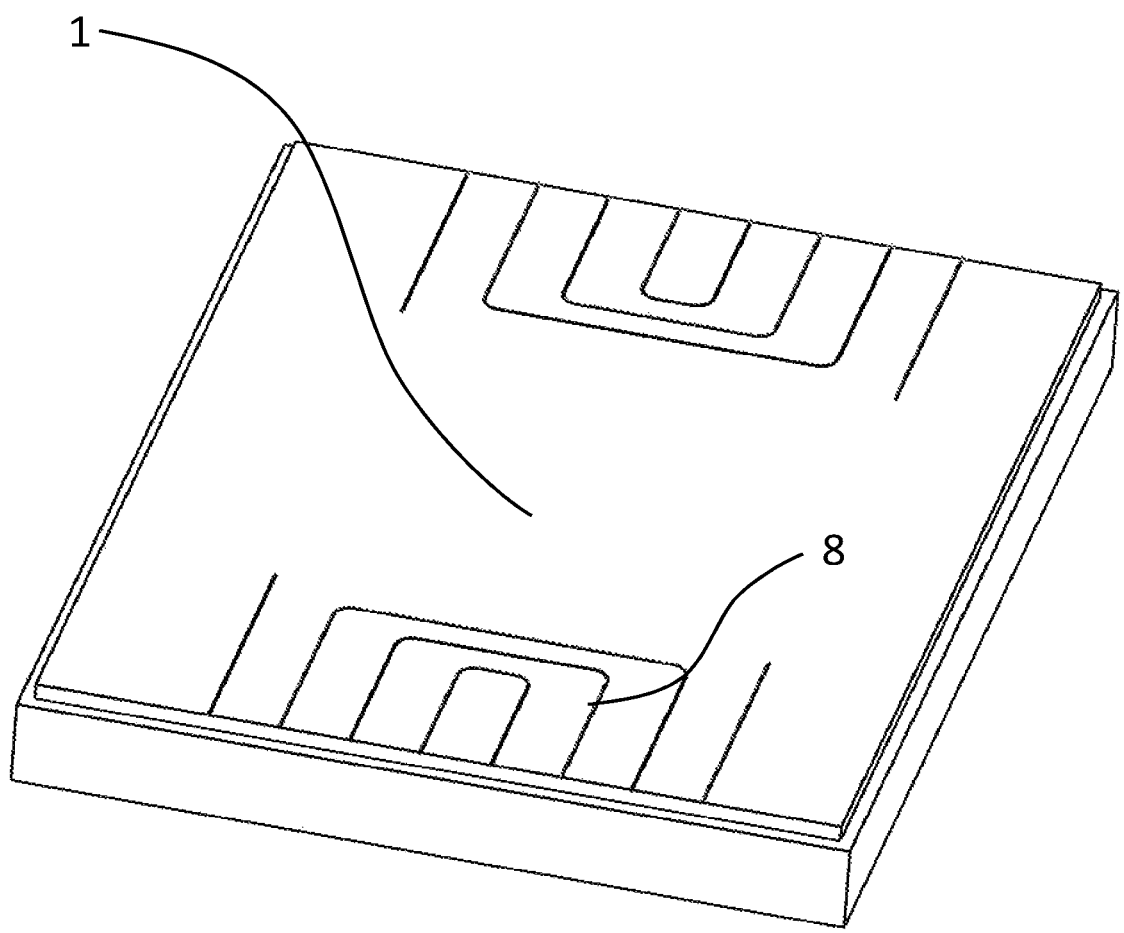
FIG. 1 shows a prior art photonic chip having a recessed rim and FIG. 1A is an inset of a portion of the prior art chip of FIG. 1.

Photonic Chip Features for Prevention of Adhesive Spread

The present disclosure relates to providing a trench etch that adds geometric features to the recessed rim of the trench which disrupts the flow of the adhesive along the rim, thus preventing the flow from attaching a fiber from interfering with the attachment of additional fibers in succession. In the edge coupling approach, numerous implementations exist in research. These include active alignment with no constraints and/or to grooves (V-shaped, U-shaped, and the like) with very precise dimensions which have been etched into the chip targeting a more cost-effective passive alignment approach. The present disclosure applies to all implementations of edge coupling to a waveguide on a photonic chip because even when the chip has multiple grooves the rim allows the adhesive to flow from one groove into another.

The present disclosure discloses the use of silicon, but this approach may also be implemented with other materials that can etched, formed or machined. The disclosure relating to features for prevention of adhesive spread is limited to chips with recessed rims since the adhesive can only interfere with the attachment of additional fibers when the adhesive spreads along a recessed rim which is relatively close to the chip surface. This disclosure is applicable to fiber attachment to chips with or without grooves, preferably the chip has a recessed rim.

In an embodiment, the method for attaching an optical fiber to a photonic chip, includes bringing a plurality of optical fibers to an edge of a photonic chip having a trench around the periphery of the photonic chip forming a recessed rim, wherein the trench has geometric features corresponding to a plurality of waveguides that extend to the edge of the chip; aligning the plurality of optical fibers to the plurality of waveguides; and adhesively bonding the plurality of optical fibers to the photonic chip with adhesive, wherein adhesive flow along the recessed rim of the photonic chip is prevented from interfering with the attachment of the plurality of optical fibers. In an embodiment, the chip has a plurality of fiber grooves each extending from an end of the waveguide to the end of the recessed rim.

In the present disclosure the recessed rim contains the geometric features that will disrupt and prevent the flow of adhesive along the recessed rim. The width of the geometric features does not have to be very wide, for example it could be on the order of 10-20 microns wide. Although the height of the features can be the full height of the trench that forms the recessed rim, it does not have to be full height. The height of the features can be only a portion of the height of the trench that forms the recessed rim, for example it only needs to be on the order of 20-30 microns tall to disrupt and prevent the flow of adhesive. Suitable geometric features include those with widths and/or heights suitable to prevent interference from adhesive flow to adjacent waveguide attachment locations. Suitable geometric features include those of varying widths, varying heights and combinations thereof.

An embodiment of the present process for attaching a fiber to a photonic chip is as follows: a photonic chip is characterized to precisely locate the waveguides that will have fibers attached to them. Then an optical fiber is brought to the first waveguide location. Then the fiber is precisely aligned to the waveguide by putting light into the fiber and measuring the signal coming out of the waveguide, typically an electrical output from a photodetector is measured or the optical power coming out of another end of the waveguide is measured. The alignment is performed by moving the fiber in three dimensions, while monitoring the output (electrical or optical). The alignment is complete when the output is maximized. Then a small amount of adhesive, typically an optically curable adhesive, such as a clear ultraviolet (UV) curable adhesive, is dispensed at the interface of the aligned fiber to the photonic chip. At this point the mass of the adhesive typically moves the fiber from its aligned position, so the alignment process needs to be repeated. After the fiber is realigned, the adhesive is cured, typically with UV light. In the prior art, the adhesive that spreads along the recessed rim will be cured and this cured adhesive will prevent any other optical fibers from being aligned to any other waveguides that have the spread adhesive under their locations. In the present disclosure the geometric features prevent the adhesive spread and fibers can be attached to a waveguide, including those immediately adjacent to the waveguide to which a fiber was previously attached. In an embodiment, the chip has a plurality of fiber grooves each extending from an end of the waveguide to the end of the chip at the recessed rim.

In an embodiment, the photonic chip includes a trench around the periphery of the photonic chip forming a recessed rim, wherein the trench has geometric features corresponding to a plurality of waveguides that extend to the edge of the chip.

The trench along the periphery of the chip is typically formed using photolithography and Deep Reactive Ion Etching (DRIE), although it is sometimes formed by other methods such as laser ablation, mechanical dicing, and the like. The trench is typically 50-200 microns deep. The recessed rim is formed around the periphery of the photonic chip when the wafer is singulated, typically by mechanical dicing, into a plurality of individual the photonic chips. The geometric features can be formed at the wafer level during the same process that created the trenches. The width of the geometric features does not have to be very wide, for example it could be on the order of 10-20 microns wide.

Although the height of the features can be the full height of the trench that forms the recessed rim, it does not have to be full height. The height of the features can be only a portion of the height of the trench that forms the recessed rim, for example it only needs to be on the order of 20-30 microns tall to disrupt and prevent the flow of adhesive.

Photonic Chip Features for Fiber Attachment into Grooves

The present disclosure provides a method of easily placing fibers and/or fiber arrays into grooves without damaging either the fiber or the chip. This disclosure describes features incorporated in the etched groove which will make the insertion of fibers into the grooves easier, faster, and less prone to damage. This will increase assembly throughput and yield, thereby lowing product cost.

In the present disclosure the entry portion of the groove has its edges angled or flared outward. The length of the angled portion of the grooves does not have to be very long, for example it could be on the order of 20% of the total groove length. The angle also does not have to be very large, for example it only needs to be angled such that the width of the groove at it entrance is only on the order of 20-30 microns wider than the width of the non-entrance portion of the groove providing increased clearance between the fiber and the groove entrance.

The present disclosure discloses the use of silicon, but this approach may also be implemented with other materials that can etched, formed or machined. The disclosure relating to photonic chip features for improved fiber attachment into grooves can be done on chips without recessed rims as well as on chips with recessed rims. Typically, chips without recessed rims are much more common than chips with recessed rims.

In an embodiment, a method for attaching an optical fiber to a photonic chip, includes inserting an end of an optical fiber into an optical fiber groove of a photonic chip by guiding the end of the optical fiber into a flared opening of an entrance portion of the fiber groove, thereby minimizing damage to the optical fiber or the photonic chip. The method further includes inserting the end of the optical fiber into the fiber groove terminating at a waveguide of the photonic chip. The method also includes bonding the inserted optical fiber to the photonic chip by applying adhesive to the photonic chip. Suitable adhesive includes optically curable adhesive.

An advantage of using photonic chips with optical fiber grooves is that the motions required to align the fiber to the waveguide are much less than on chips without grooves. This is because the precise tolerances of the grooves mean that the fiber is typically already roughly aligned with the waveguide as soon as it is inserted into a groove. Because of this the process of attaching a fiber to a photonic chip which has grooves is much faster than it is to a chip without grooves. However, the process steps are very similar. A photonic chip is characterized to precisely locate the grooves with waveguides that will have fibers attached to them. Then an optical fiber is brought to the entrance of the first groove and slowly inserted into the groove until it is within microns of the waveguide at the end of the groove. Then the fiber is precisely aligned to the waveguide by putting light into the fiber and measuring the signal coming out of the waveguide, typically an electrical output from a photodetector is measured or the optical power coming out of another end of the waveguide is measured. The alignment is performed by moving the fiber very small amounts, typically only 1-5 microns, in three dimensions, while monitoring the output (electrical or optical). The alignment is complete when the output is maximized. Then a small amount of adhesive, typically an optically clear ultraviolet (UV) curable adhesive, is dispensed into the groove. The tight tolerances between the fiber and the walls of the groove create high surface tension which allows the adhesive to wick along the entire fiber along the total length of the groove. At this point the mass of the adhesive typically moves the fiber from its optimally aligned position, so the alignment process is repeated. After the fiber is realigned, the adhesive is cured, typically with UV light. In the prior art, there is a high probability of the fiber or the chip getting damaged when the fiber is inserted into the groove. This damage is typically at the fiber end and/or the corners of the groove on the chip. In addition to this, the fibers also can break during the alignment process because of the stress concentration created in the fiber at a location of the groove entrance. Very small motions of the fiber cause the fiber to contact the sharp corner of the groove at its entry and this contact results in very high stresses that are enough to fracture the fiber. In the present disclosure the angled entry of the flared portion of the groove provides much more clearance between the fiber and the groove at its entry point. Thus, the fiber is much less likely to contact the chip and the fiber can move much more during alignment before contacting the corner at the entry to the groove. As a result of the structure of the present disclosure, there is a much lower probability of the fiber and or chip being damaged during the fiber attach process than with the prior art structure.

In an embodiment, the photonic chip includes at least one optical fiber groove which has an entrance portion and a non-entrance portion, wherein the entrance portion includes a flared opening having a greater clearance between the sides of the fiber and the sides of the flared opening of the groove than between the sides of the fiber and the sides of the non-entrance portion of the groove. The photonic chip can have V-shaped or U-shaped or other shaped fiber grooves. Preferably, the non-entrance portion of the fiber groove terminates at a waveguide of the photonic chip.

The grooves in the chip are typically formed at the wafer level using photolithography and Deep Reactive Ion Etching (DRIE), although it is sometimes formed by other methods such as laser ablation, mechanical dicing, and the like. The groove needs to be no less than 65 microns deep, however it can be deeper with the only penalty being a slightly longer time to precisely align a fiber. When the wafer has trenches being formed in it, then the grooves can be formed at the same time as the trenches, as long as the trench depth meets the criteria given above. However, the grooves can be formed in wafer without trenches as well. The groove width is typically 1-2 microns wider than the fibers that will be attached to the chip, for example they would be 127-129 microns wide for use with standard 125-micron diameter fibers. The groove depth needs to be at least 1-2 microns more than ½ the diameter of the fibers that will be attached to the chip, for example they are typically 65-70 microns deep for use with a standard 125-micron diameter fiber. As previously mentioned, the length of the angled portion of the grooves does not have to be very long, for example it could be on the order of 20% of the total groove length. The angle also does not have to be very large, for example it only needs to be angled such that the width of the groove at the entrance is only on the order of 20-30 microns wider than the width of the non-entrance portion of the groove, providing increased clearance between the fiber and the groove.

The disclosure will be further illustrated with reference to the following specific examples. It is understood that these examples are given by way of illustration and are not meant to limit the disclosure or the claims to follow.

EXAMPLE 1

Figure 1A:
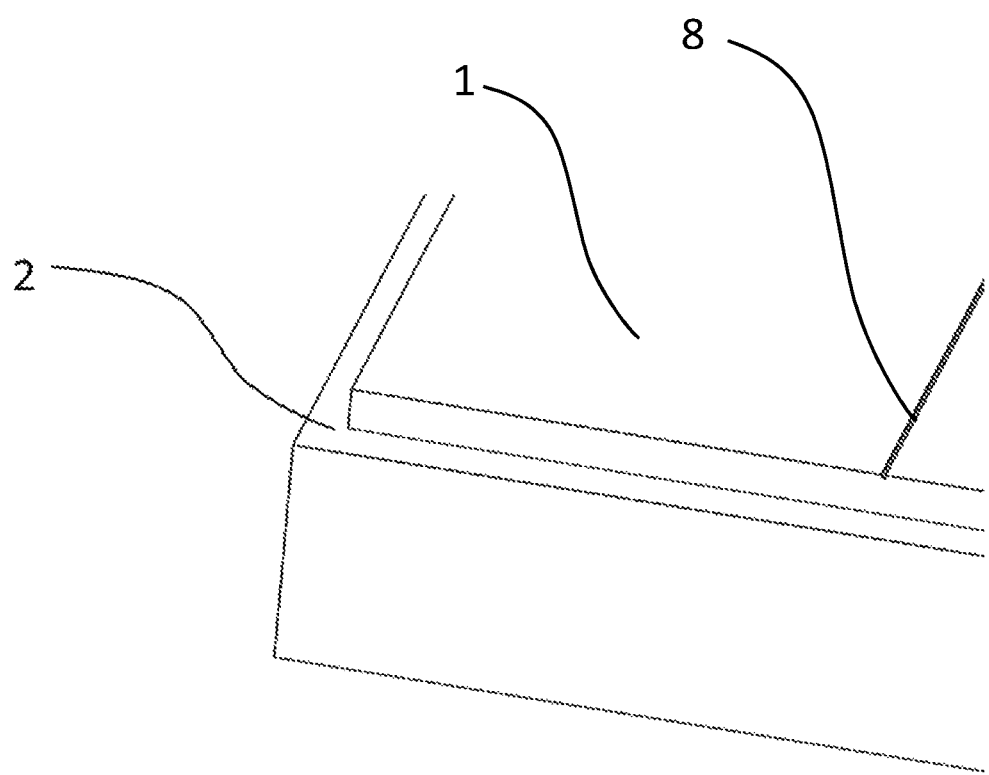
Figure 2:
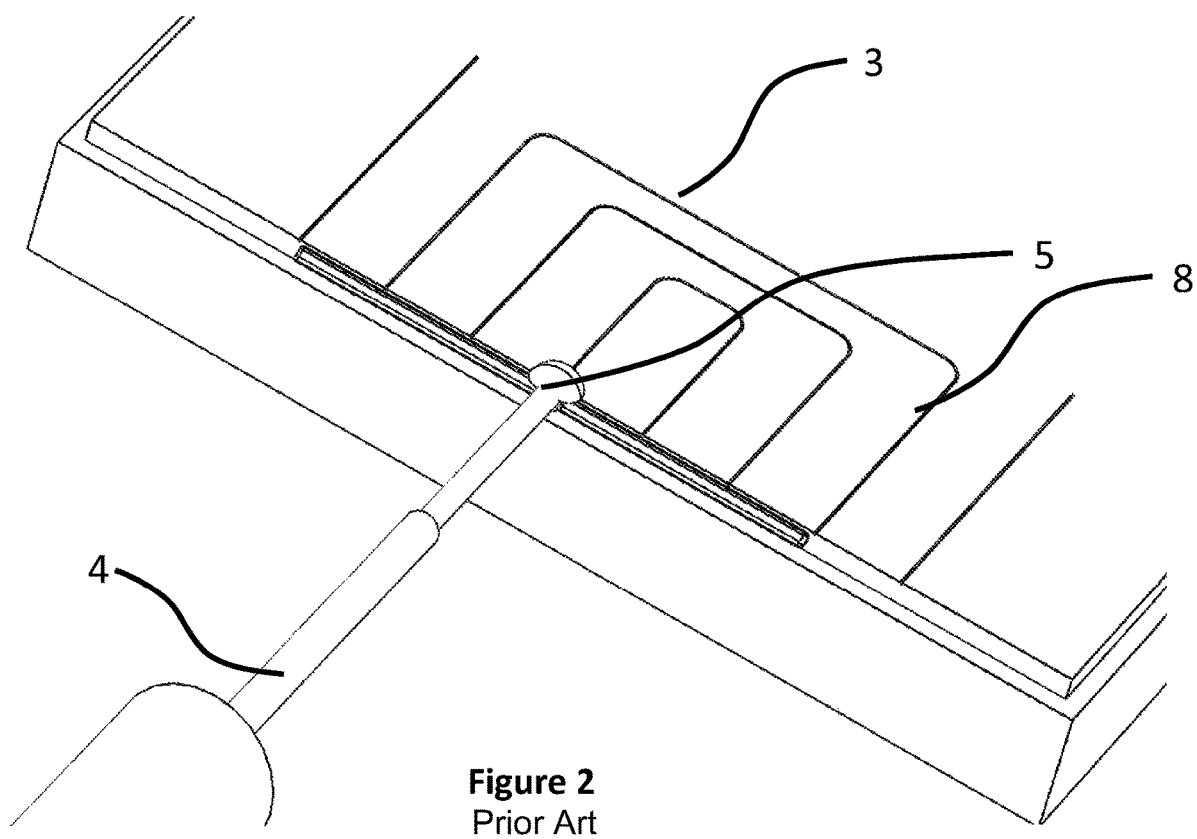
FIG. 2 shows a prior art photonic chip having a recessed rim and FIG. 2A is an inset of a portion of the prior art chip of FIG. 2.
Figure 2A:
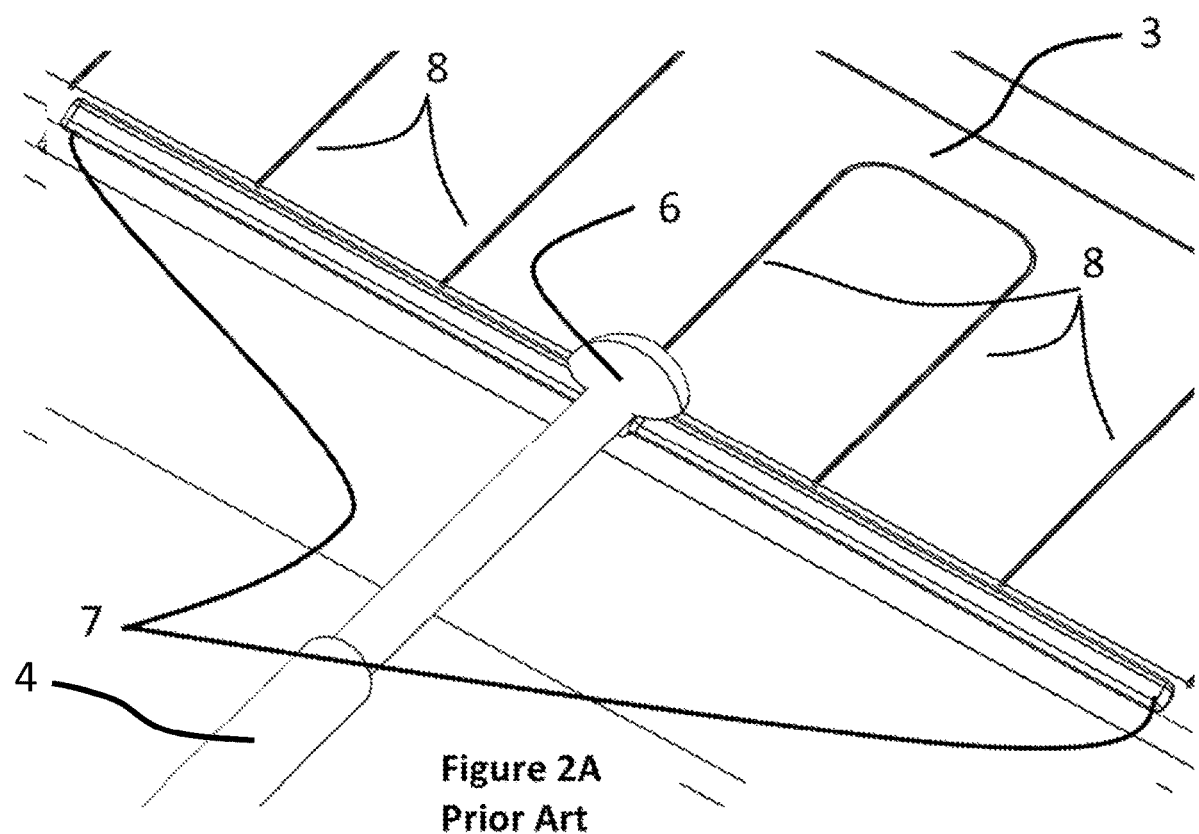
Figure 3:
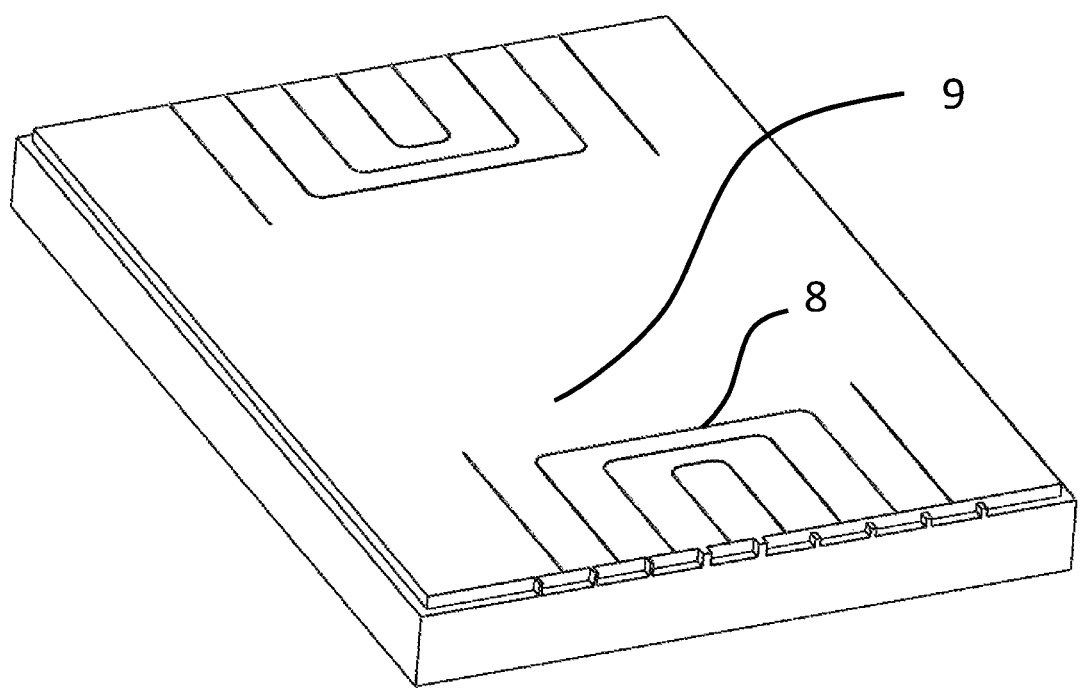
FIG. 3 shows a photonic chip having a recessed rim in accordance with the present disclosure and FIG. 3A and FIG. 3B are inset portions of the chip of FIG. 3.
Figures 3A, 3B:
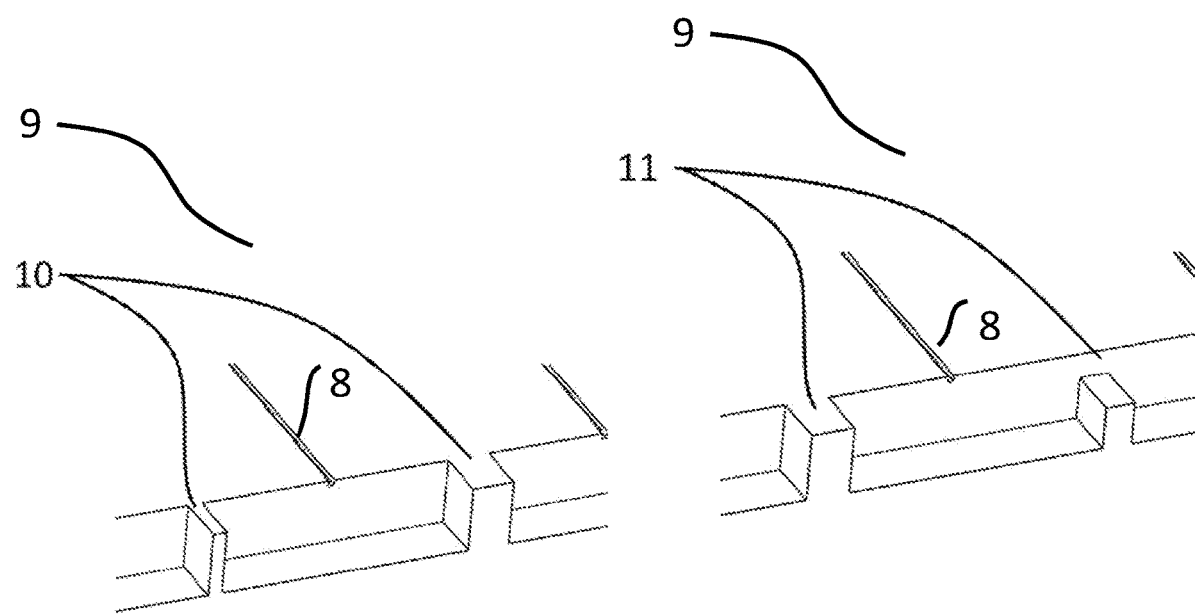
Figure 4:
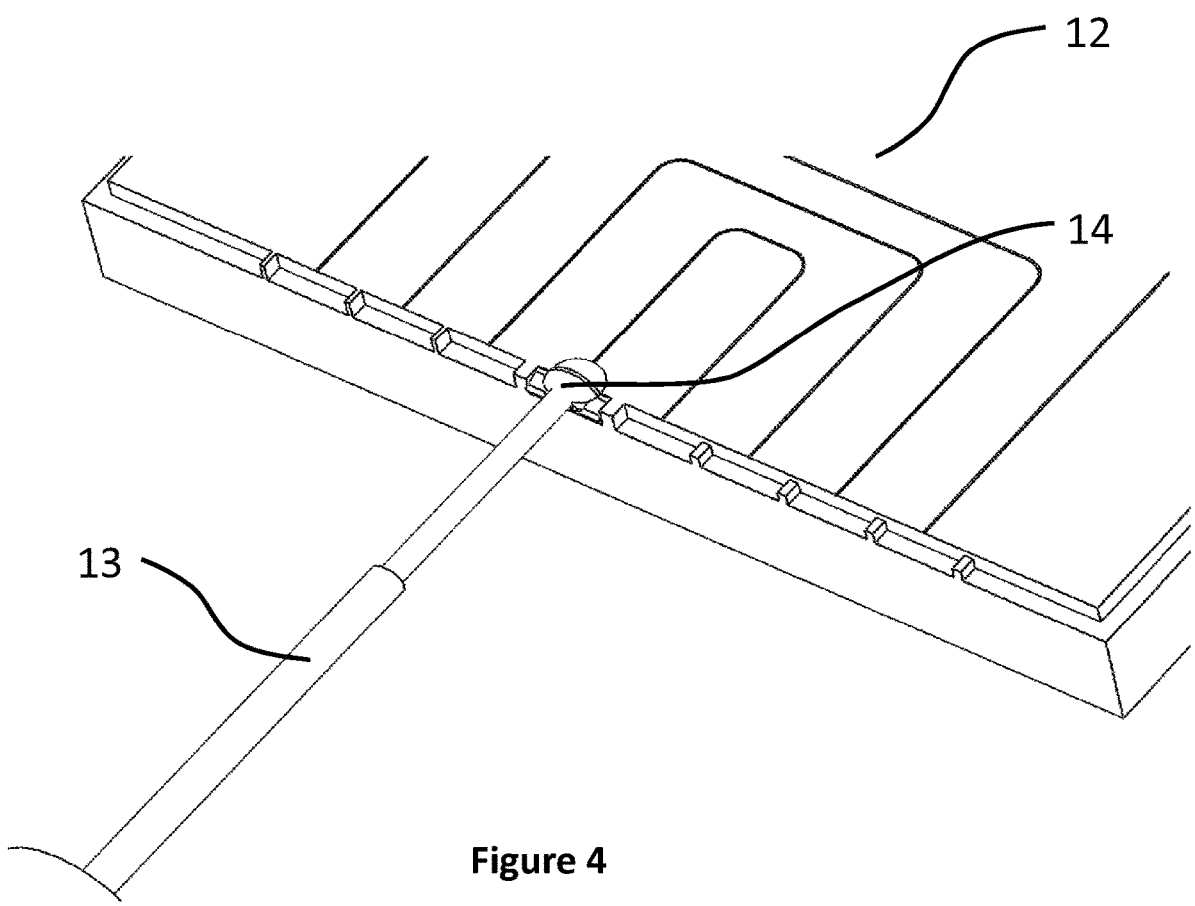
FIG. 4 shows a photonic chip having a recessed rim in accordance with the present disclosure and FIG. 4A is an inset of a portion of the chip of FIG. 4.
Figure 4A:
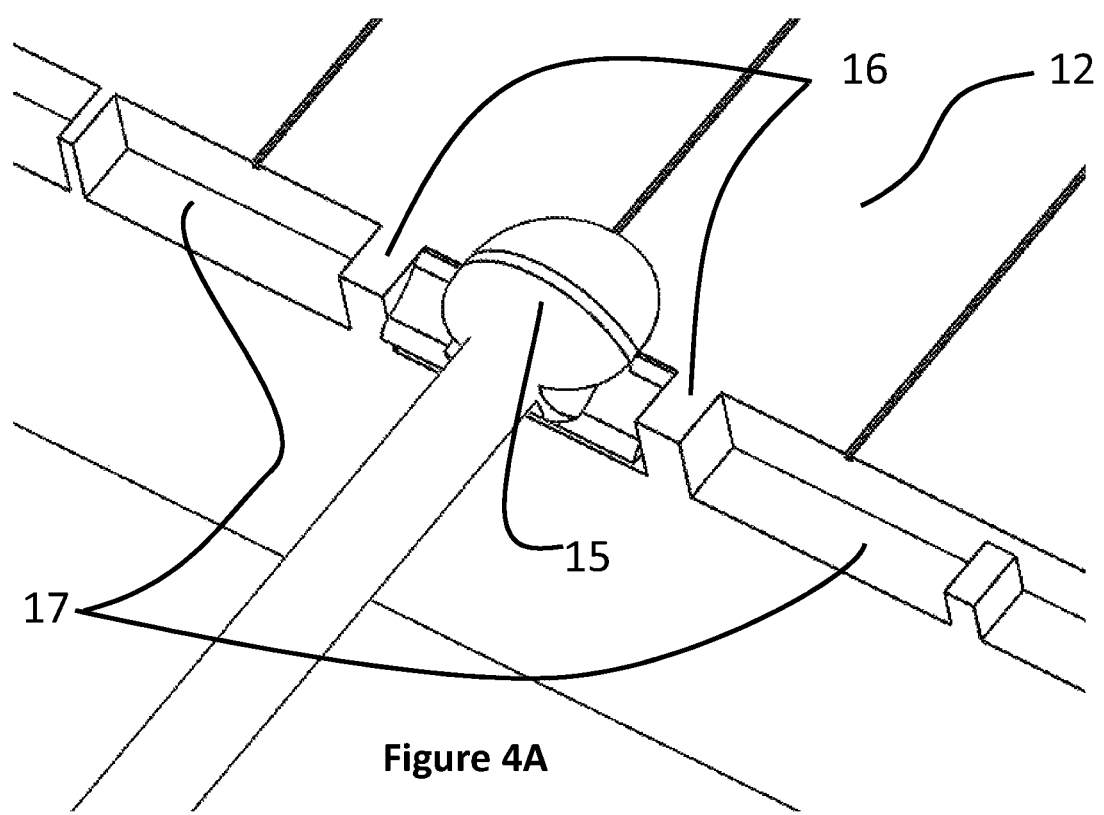
Figure 5:
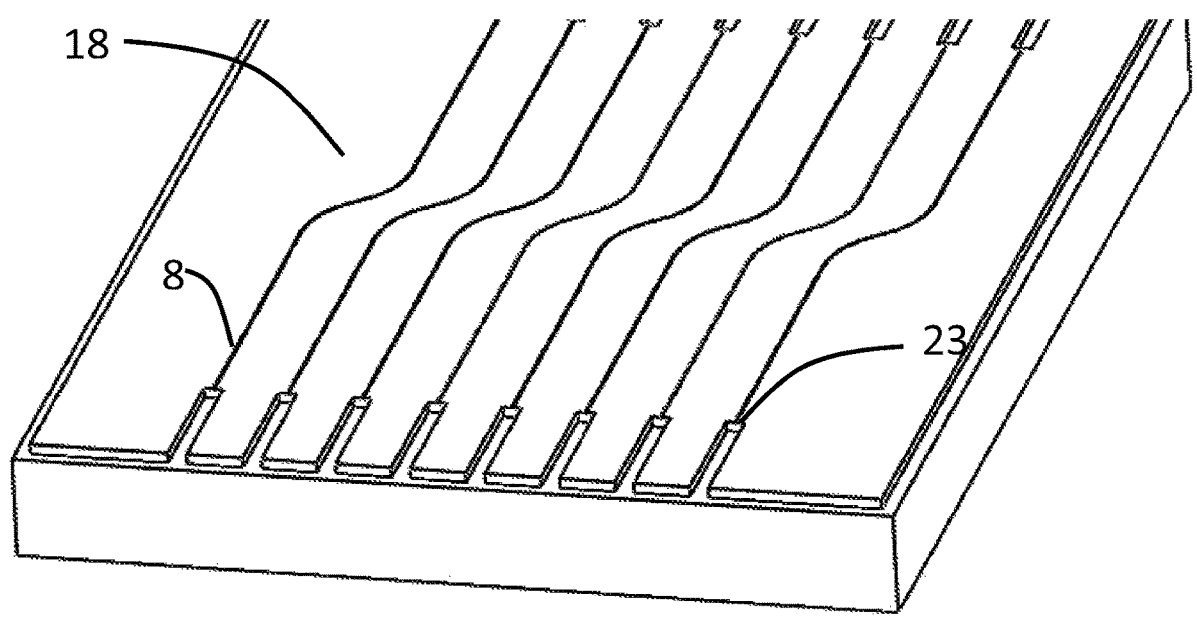
FIG. 5 shows a prior art photonic chip having a recessed rim and FIG. 5A is an inset of a portion of the prior art chip of FIG. 5.
Figure 5A:
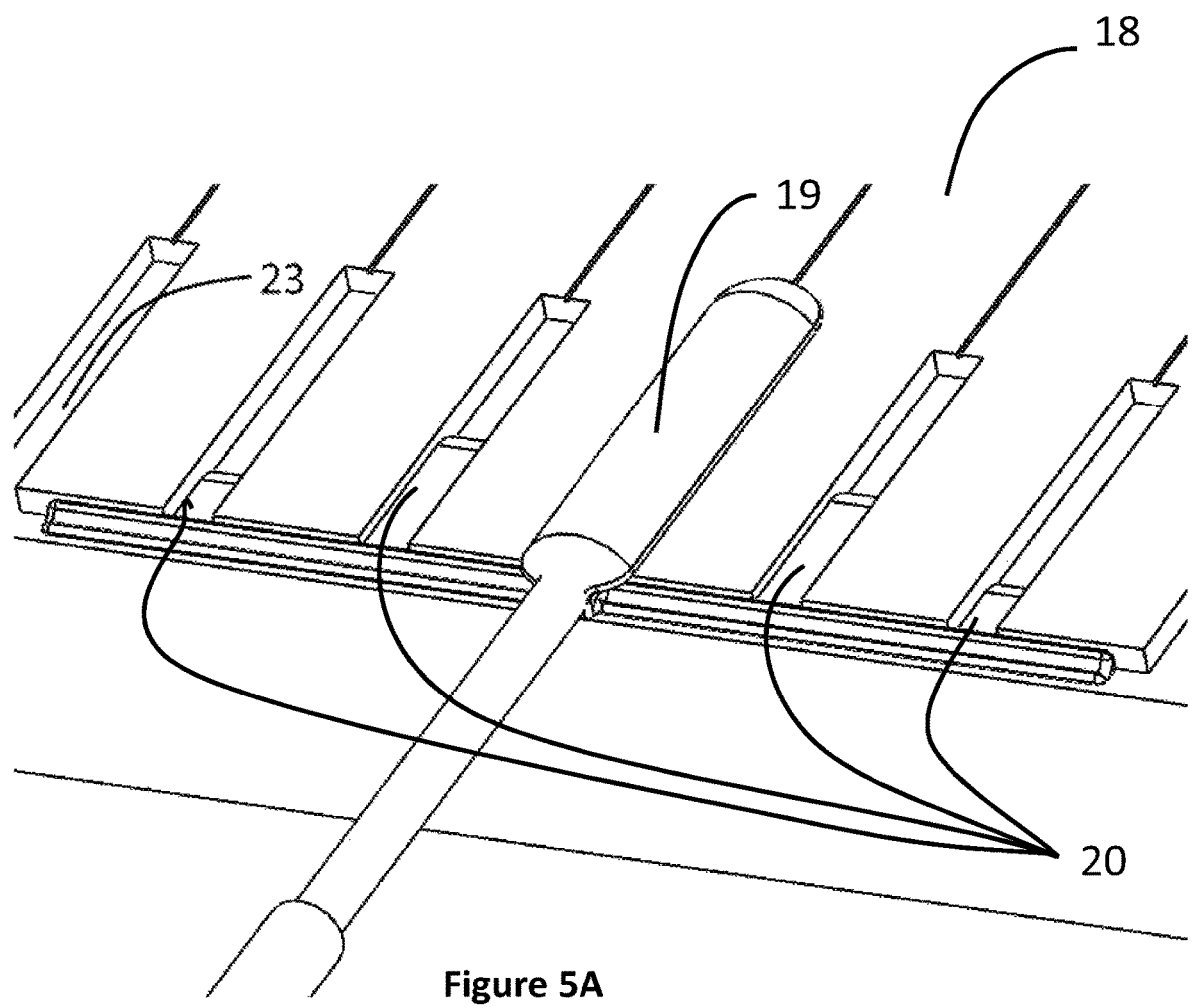
Figure 6:
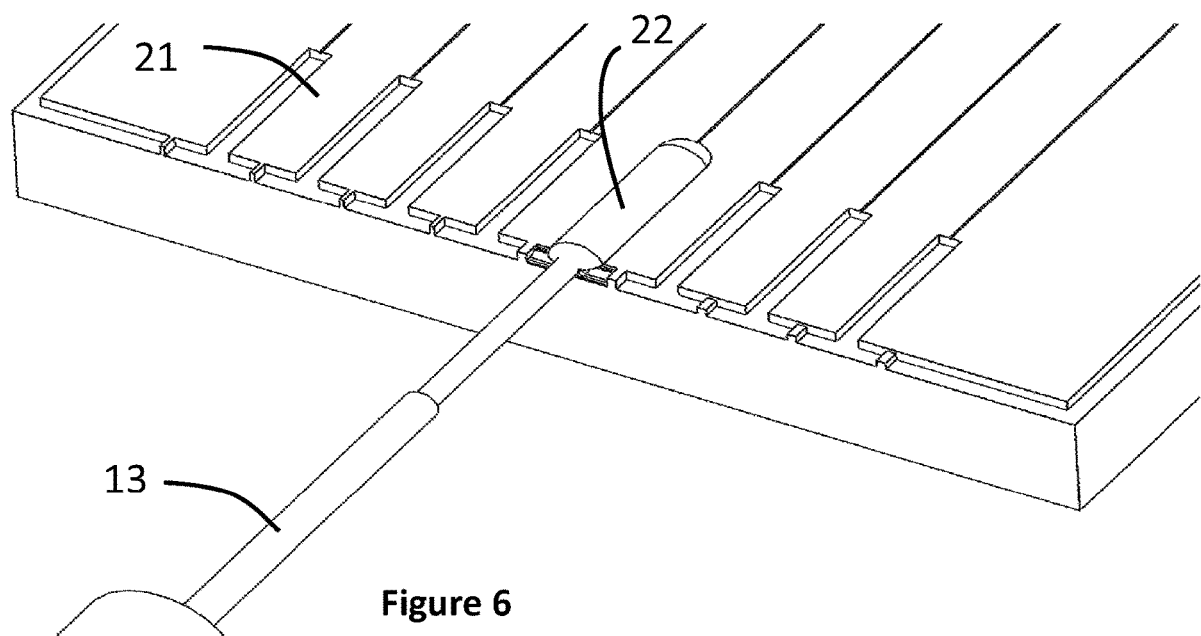
FIG. 6 shows a photonic chip having a recessed rim in accordance with the present disclosure and FIG. 6A is an inset of a portion of the chip of FIG. 6.
Figure 6A:
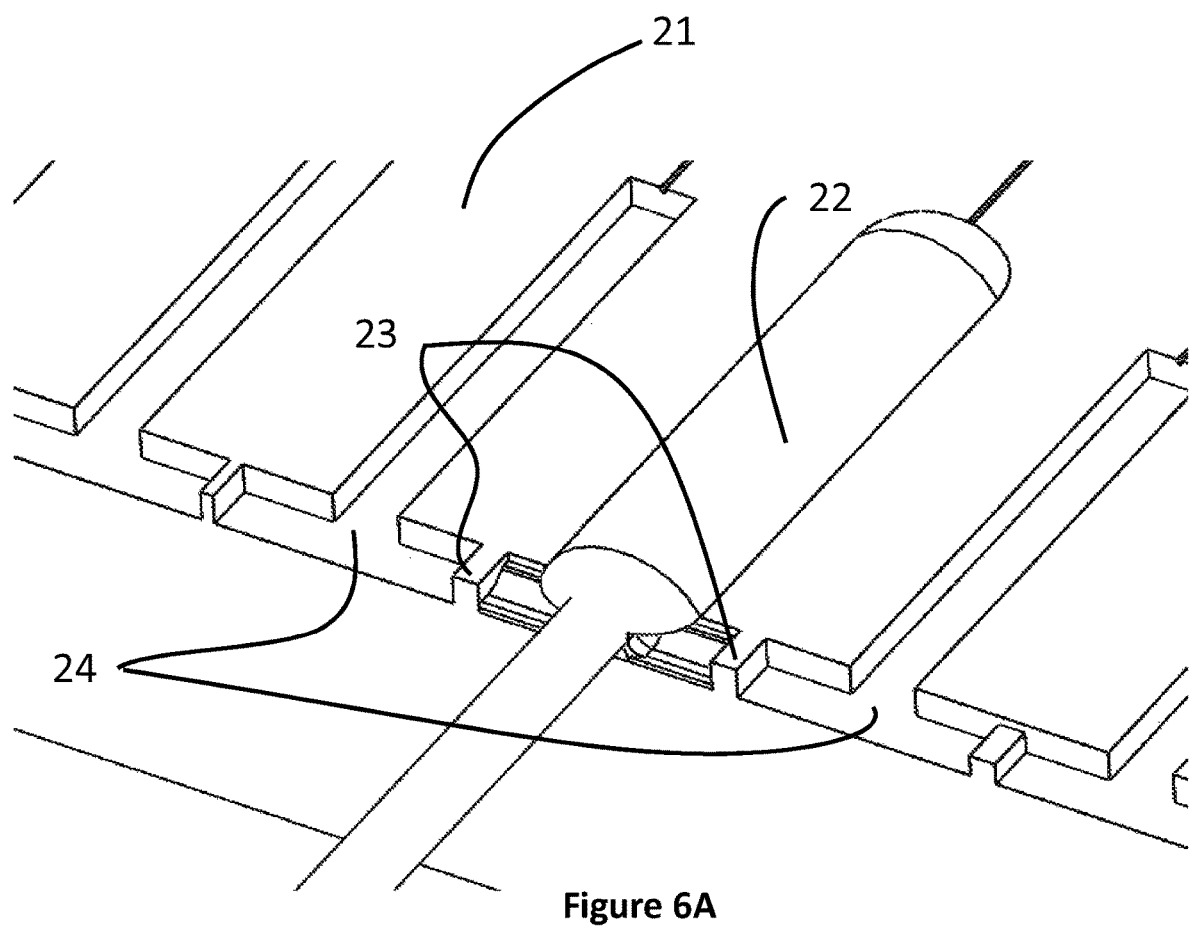

Described is an example of attaching fibers to the chip with a trench having geometric features etched in the rim in accordance with the present disclosure compared to the prior art. A prior art photonic chip 1 with edge coupled waveguides 8 is shown in FIG. 1. The prior art chip 1 has a recessed rim 2 as shown in FIG. 1A. According to the prior art an optical fiber 4 is attached to a recessed rim 2 of a photonic chip 3 using adhesive 5 as shown in FIG. 2. In the prior art adhesive 6 spreads along 7 the recessed rim 2 below multiple waveguides 8 as shown in FIG. 2A. The photonic chip 9 of the present disclosure is shown in FIG. 3. The chip 9 contains adhesive flow disrupting features 10 of varying width as shown in FIG. 3A and adhesive flow disrupting features 11 of varying height as shown in FIG. 3B. In this embodiment, optical fiber 13 is attached to the photonic chip 12 using adhesive 14, as shown in FIG. 4. In this case the adhesive 15 is contained by the adhesive flow preventing features 16 so that the adhesive 15 does not interfere with adjacent waveguide locations 17. Another embodiment of the prior art is shown as photonic chip 18 with grooves 23 in FIG. 5. In this case adhesive 19 spreads into four adjacent grooves 20 as shown in FIG. 5A. A photonic chip 21 in accordance with an embodiment of the disclosure is shown in FIG. 6. In this case the adhesive 22 is contained by the adhesive flow preventing features 23 and does not flow into adjacent grooves 24 as shown in FIG. 6A.

EXAMPLE 2

Figure 7:
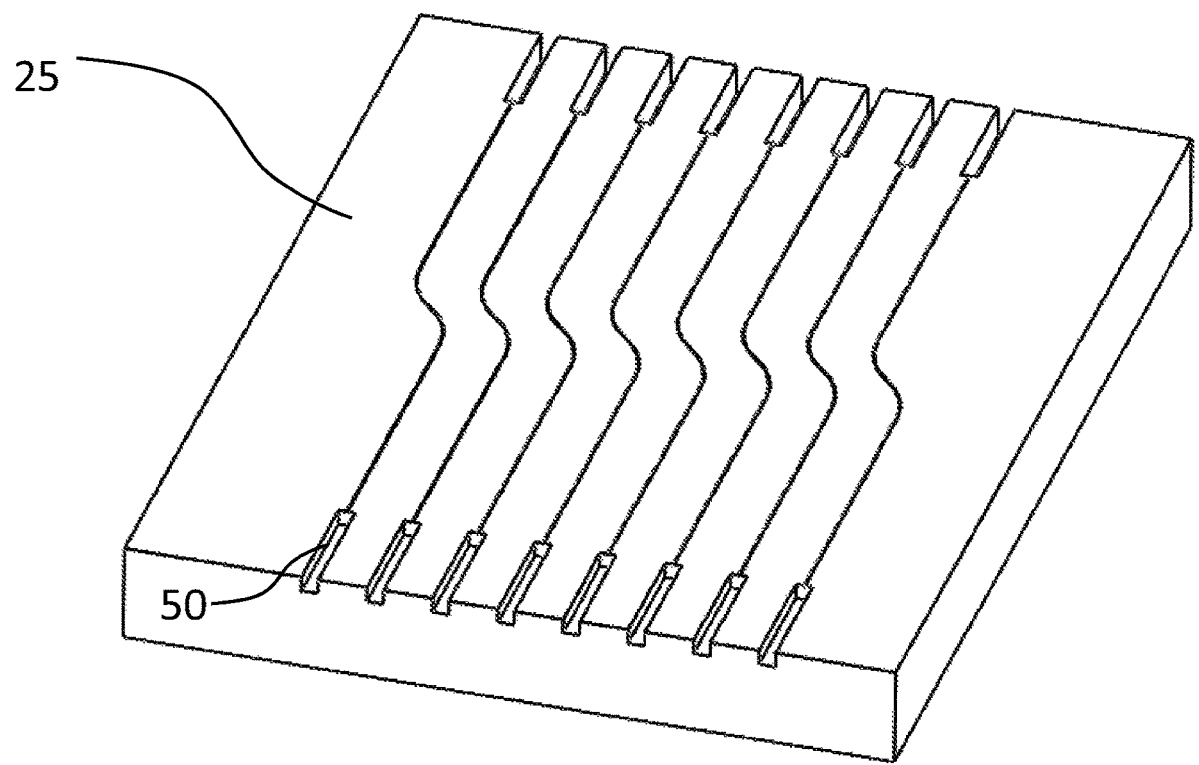
FIG. 7 shows a prior art photonic chip having U-shaped fiber grooves.
Figure 8:
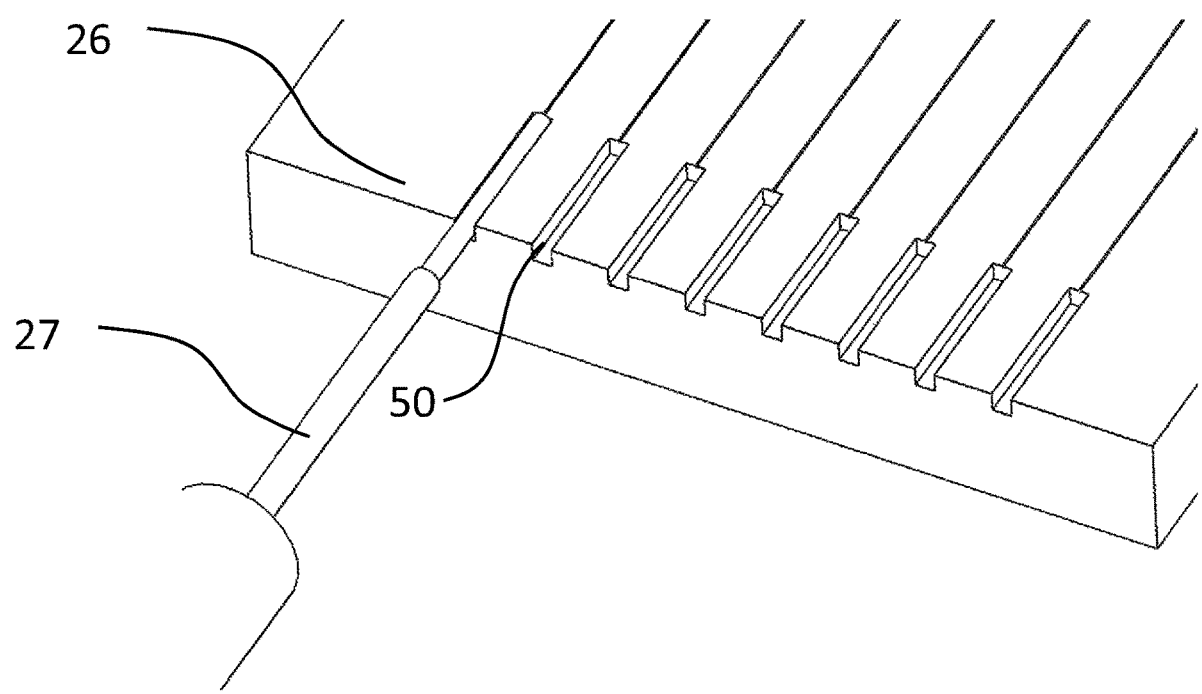
FIG. 8 shows a prior art photonic chip having U-shaped fiber grooves and FIG. 8A is an inset of a portion of the prior art chip of FIG. 8.
Figure 8A:
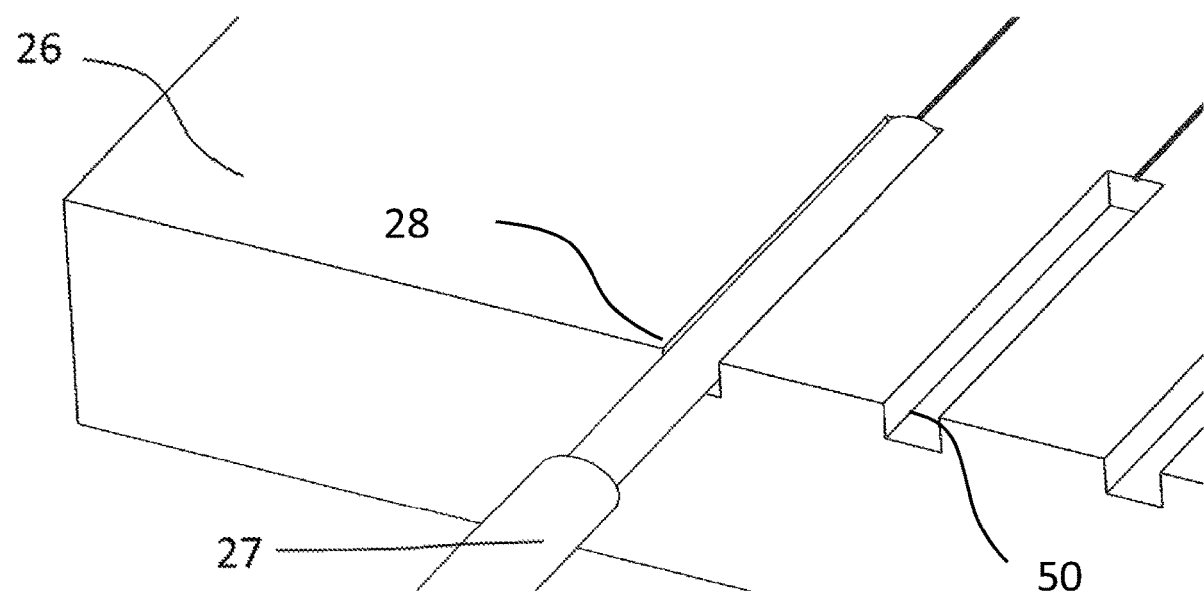
Figure 9:
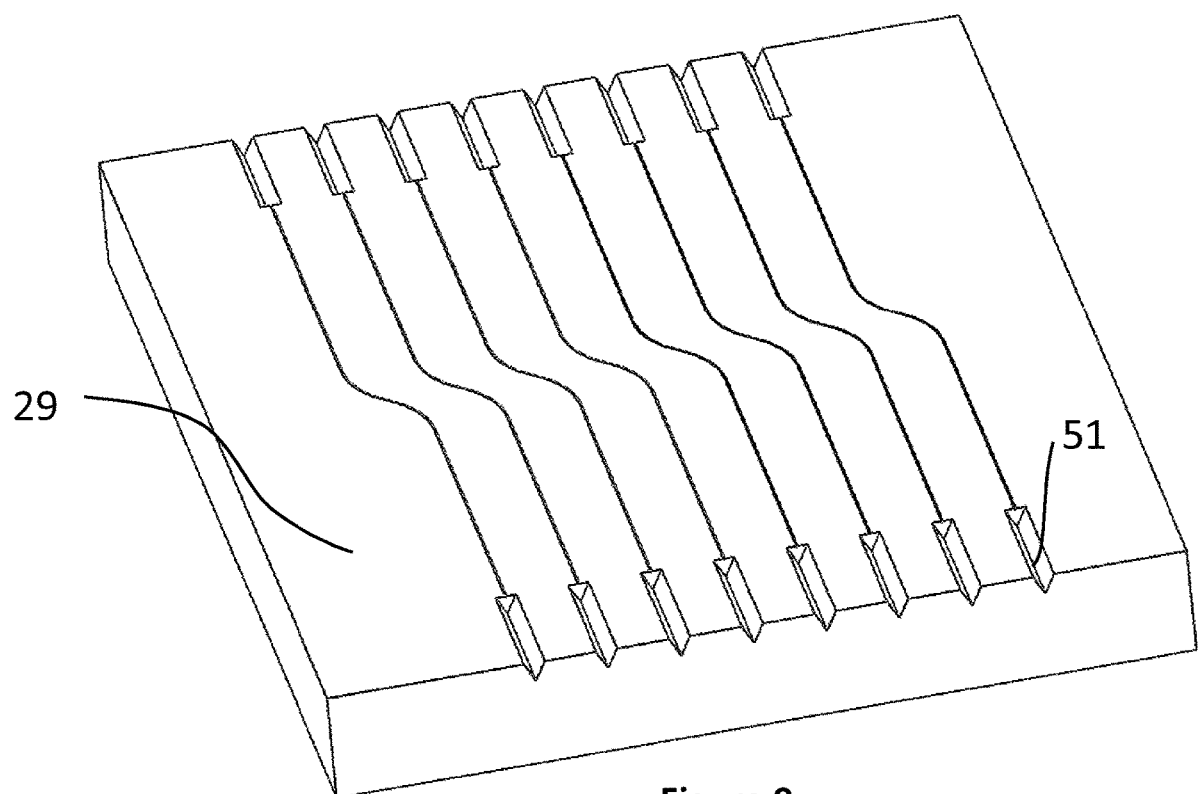
FIG. 9 shows a prior art photonic chip having V-shaped fiber grooves.
Figure 10:
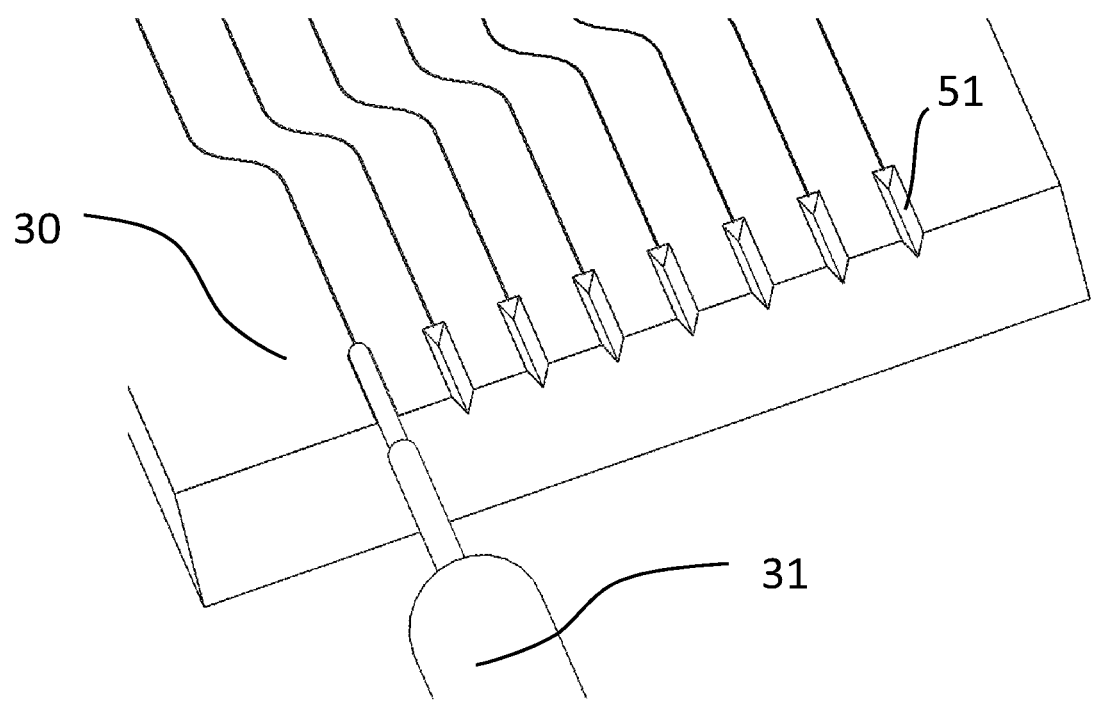
FIG. 10 shows a prior art photonic chip having V-shaped fiber grooves and FIG. 10A is an inset of a portion of the prior art chip of FIG. 10.
Figure 10A:
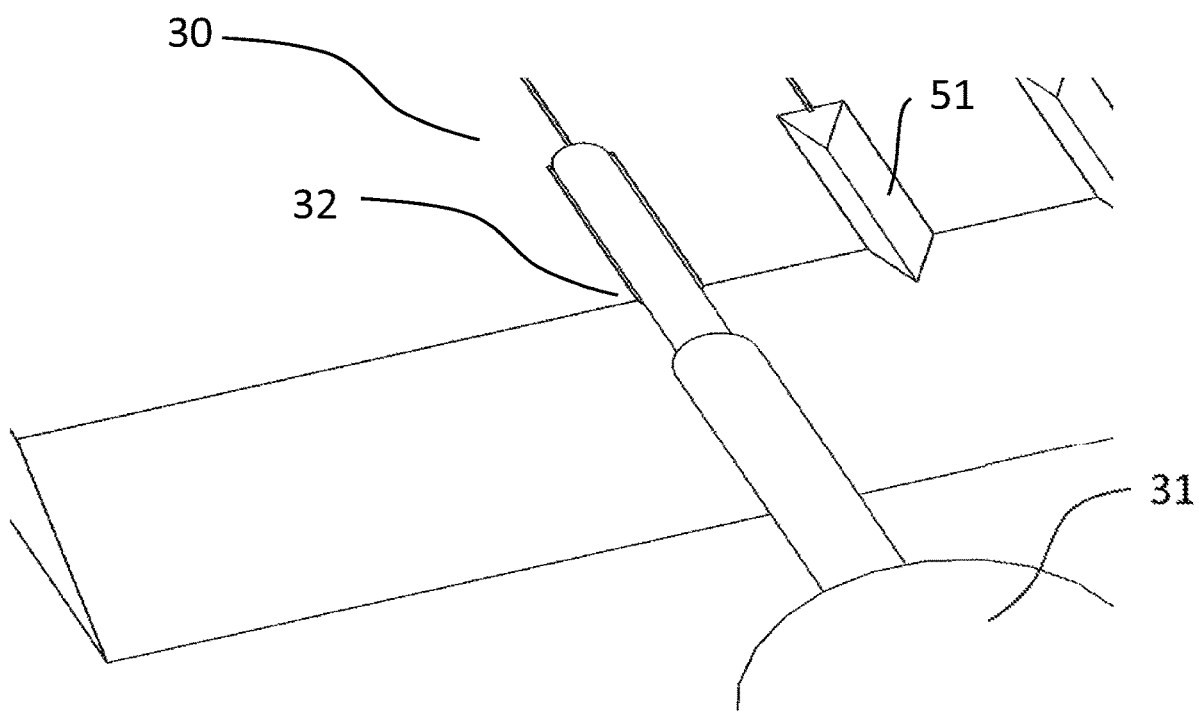
Figure 11:
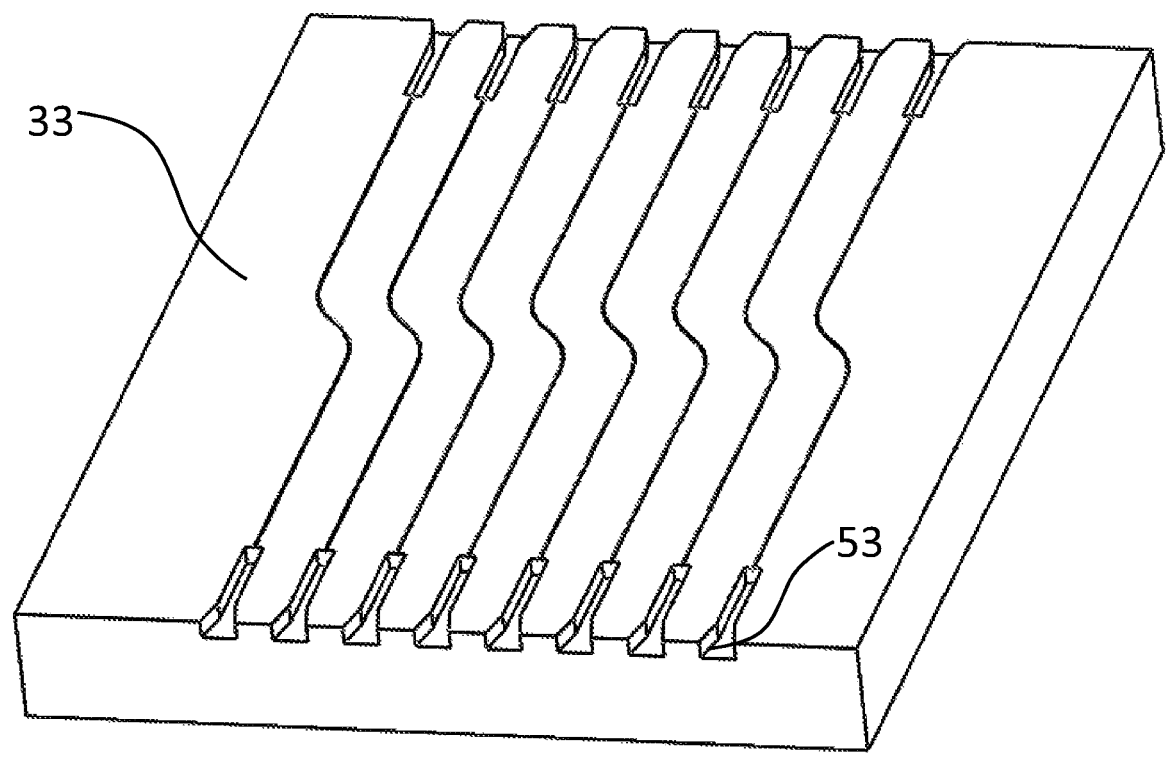
FIG. 11 shows a photonic chip having U-shaped fiber grooves in accordance with the present disclosure.
Figure 12:
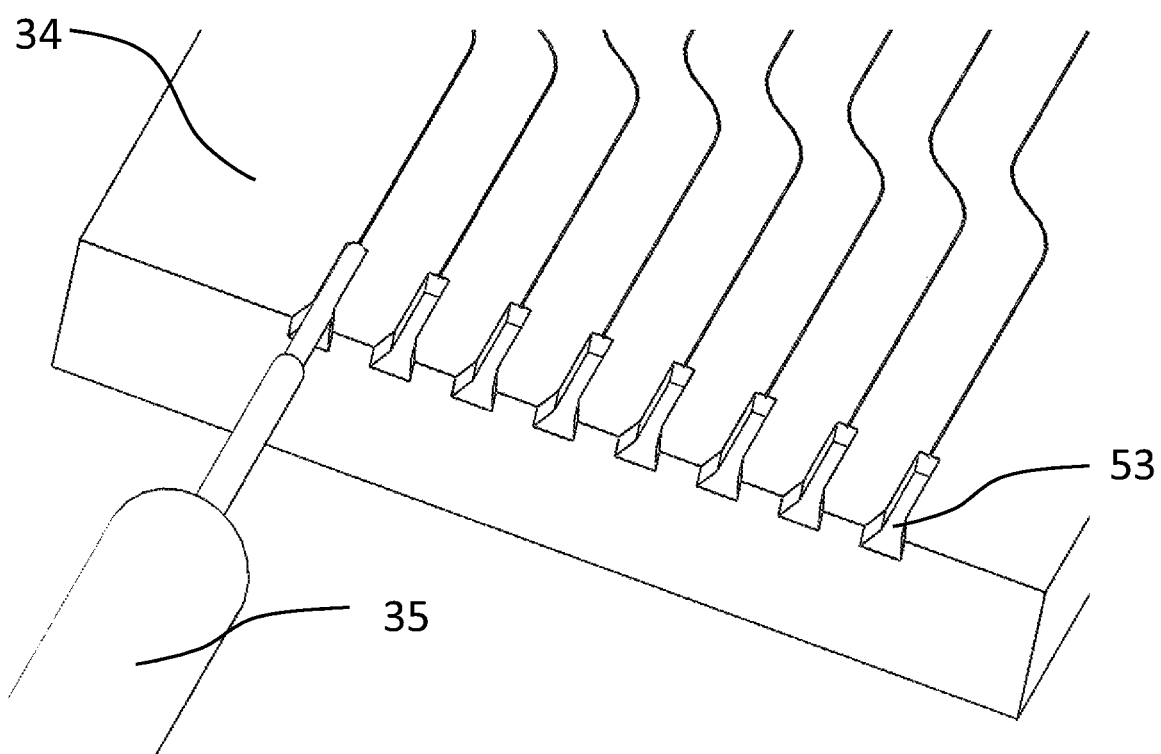
FIG. 12 shows a photonic chip having U-shaped fiber grooves in accordance with the present disclosure and FIG. 12A is an inset of a portion of the chip of FIG. 12.
Figure 12A:
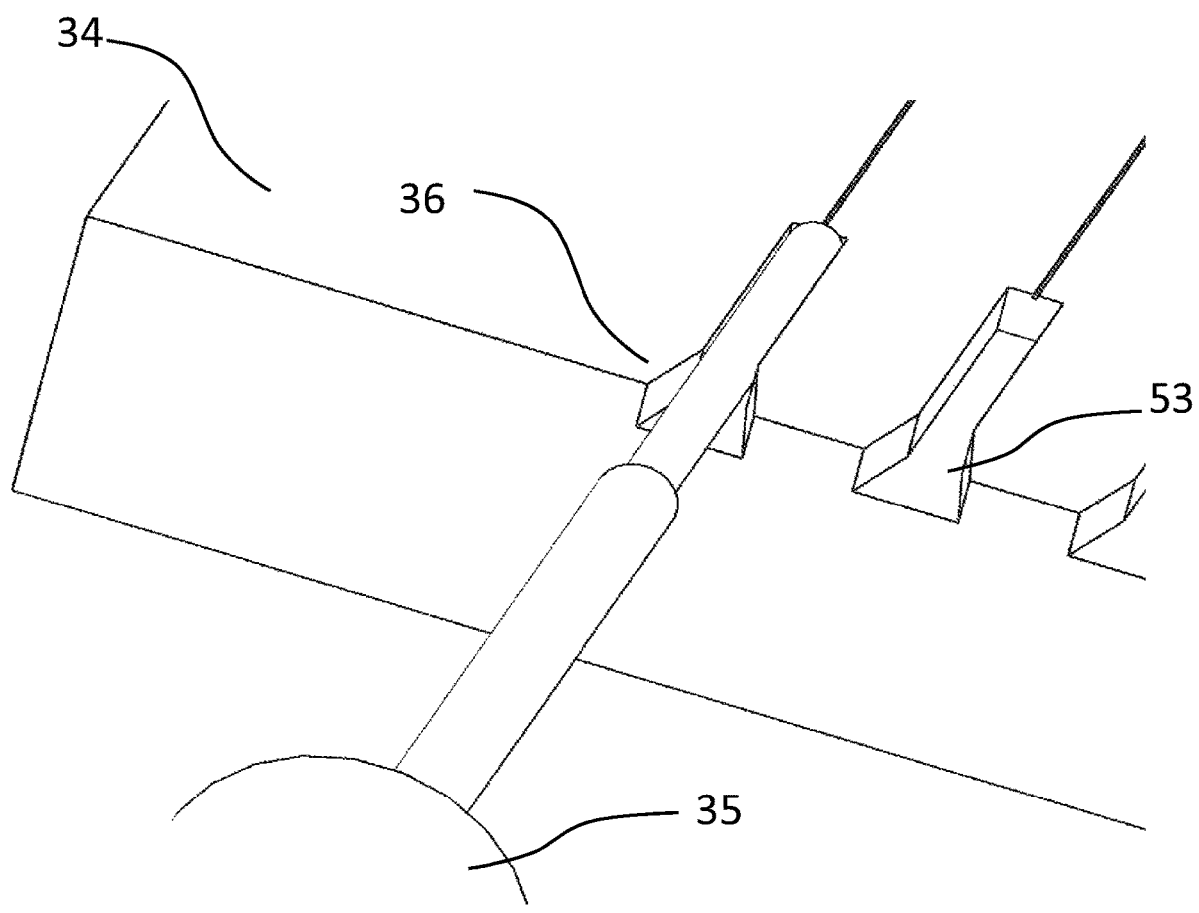
Figure 13:
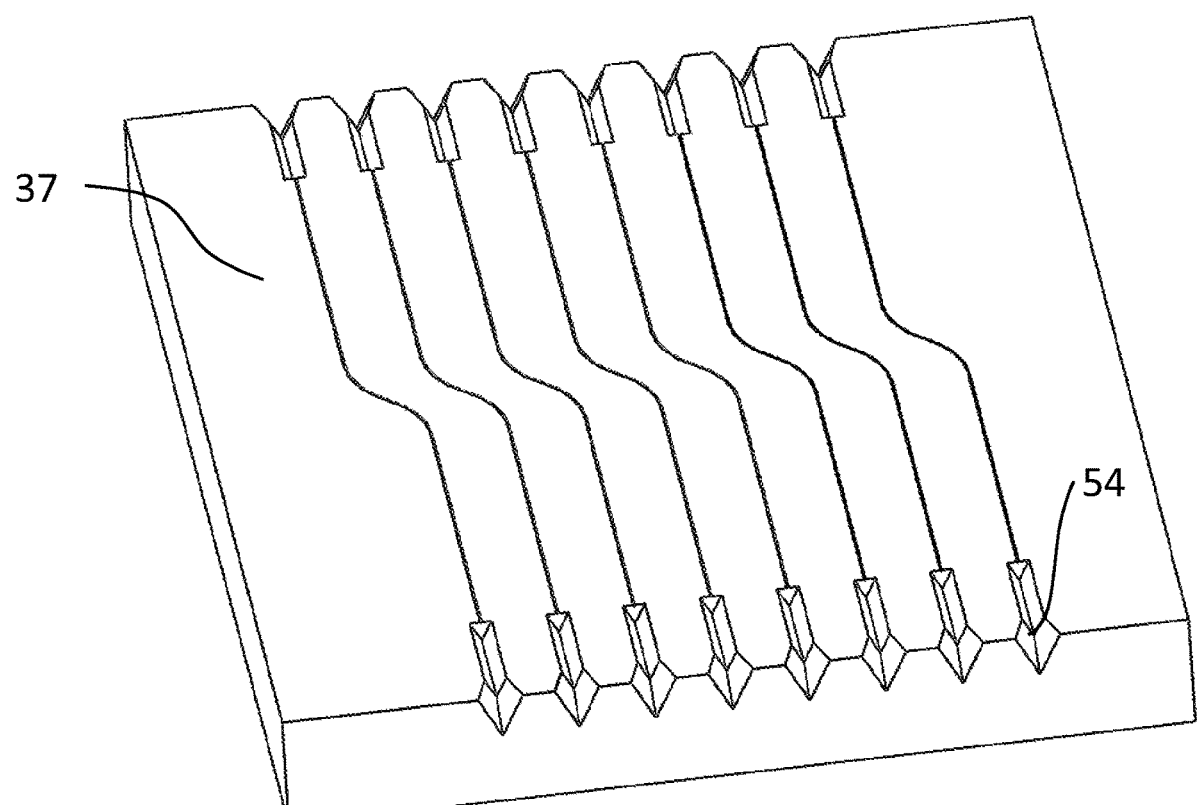
FIG. 13 shows a photonic chip having V-shaped fiber grooves in accordance with the present disclosure.
Figure 14:
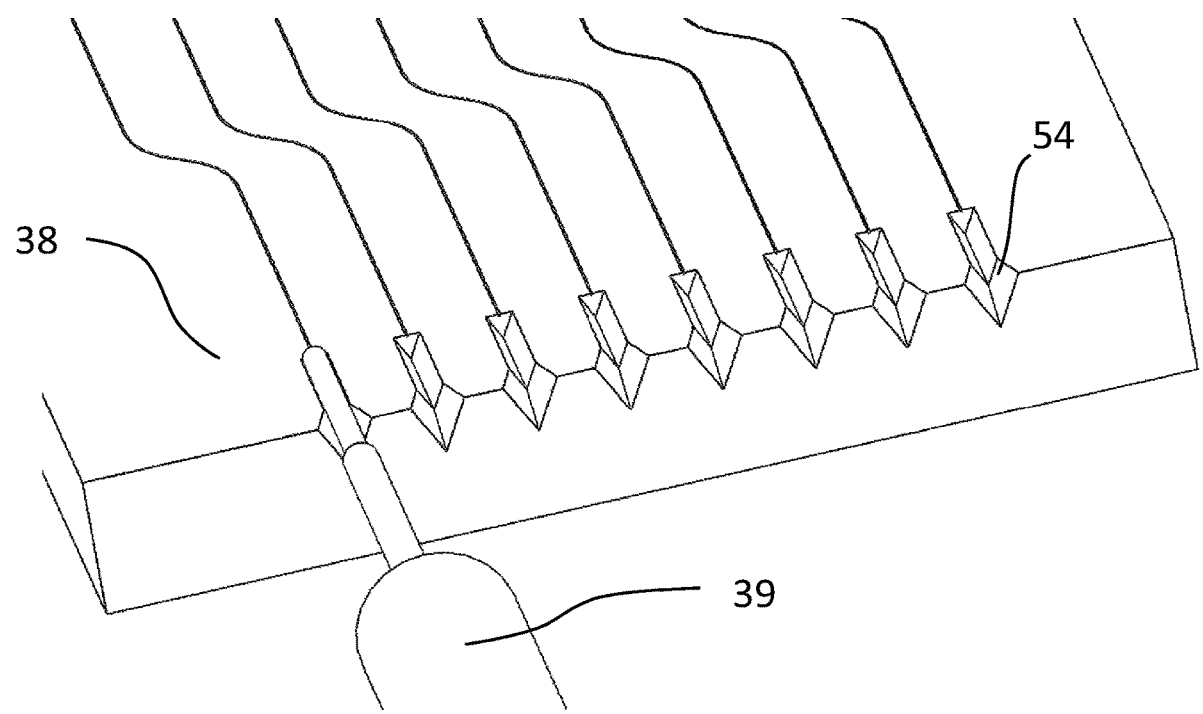
FIG. 14 shows a photonic chip having V-shaped fiber grooves in accordance with the present disclosure and FIG. 14A is an inset of a portion of the chip of FIG. 14.
Figure 14A:
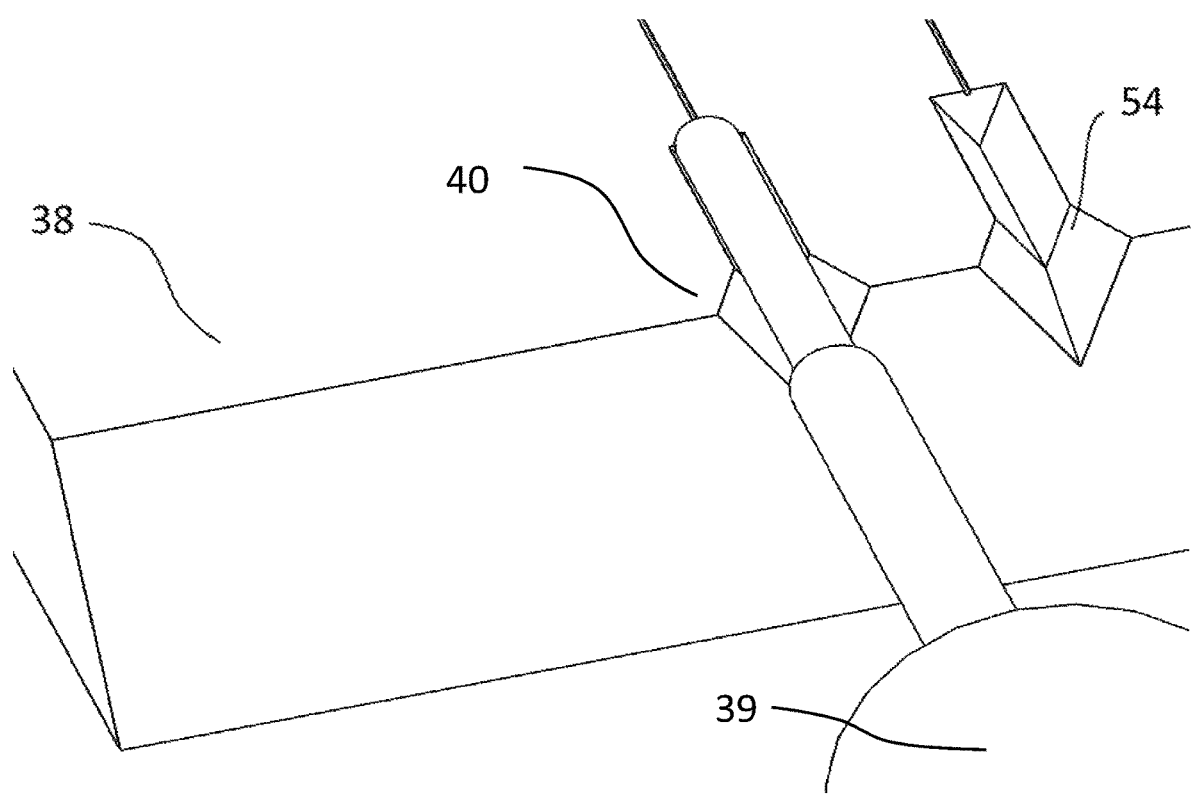
Figure 15:
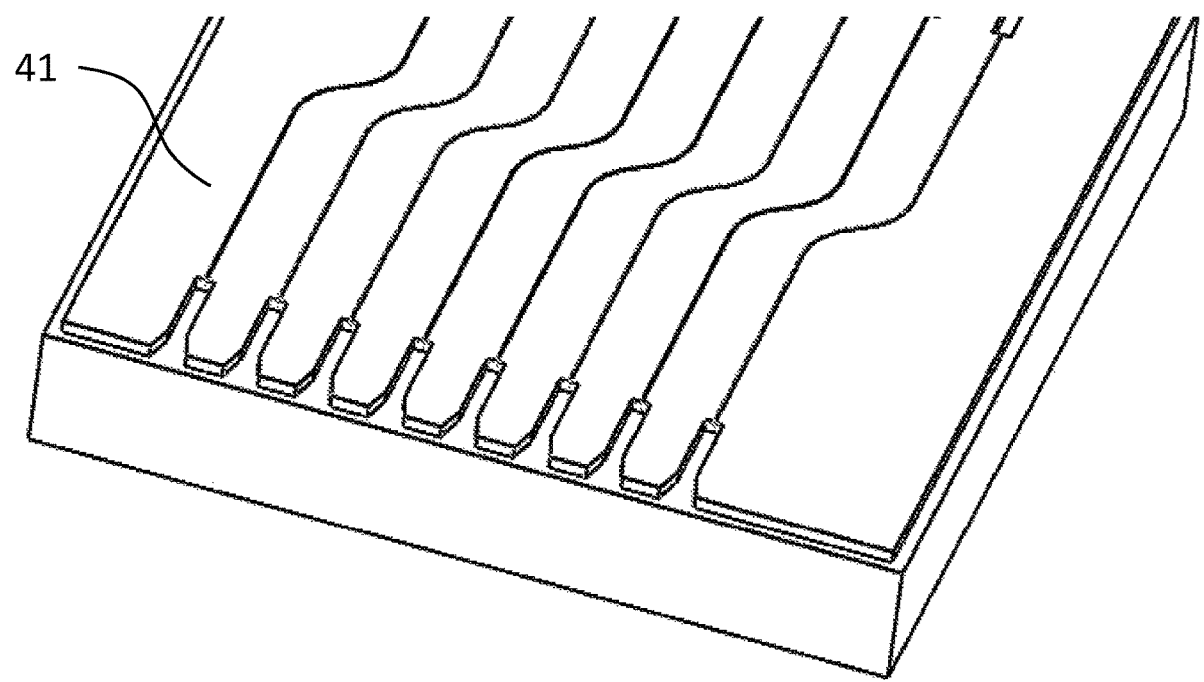
FIG. 15 shows a photonic chip having U-shaped fiber grooves and a recessed rim in accordance with the present disclosure and FIG. 15A shows a photonic chip having V-shaped fiber grooves and a recessed rim in accordance with the present disclosure.
Figure 15A:
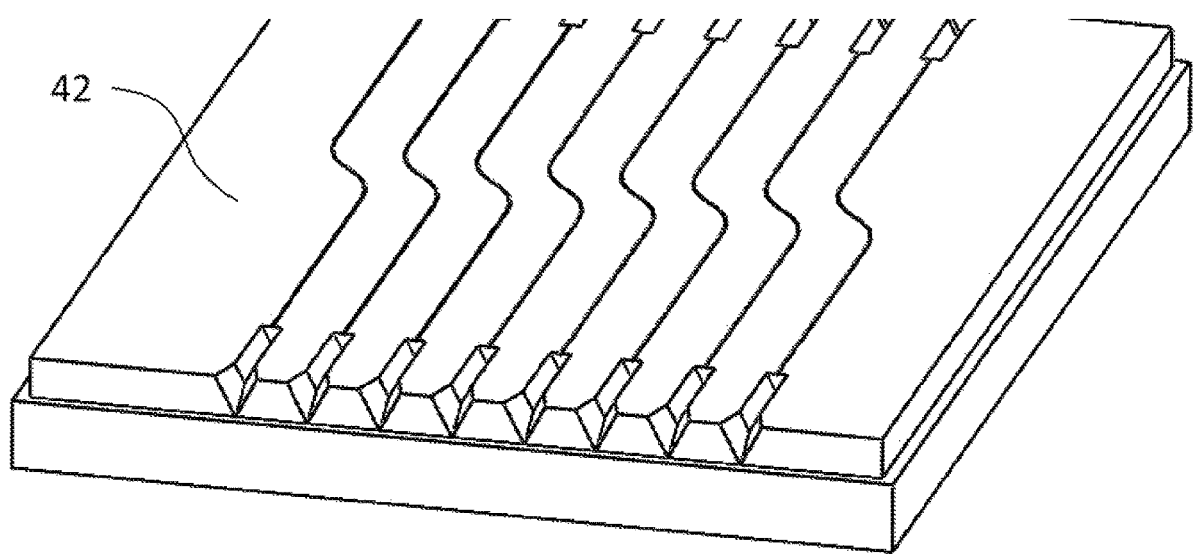

Described is an example of attaching fibers to the chip having a flared opening to the grooves in accordance with the present disclosure compared to the prior art. A prior art photonic chip 25 with U-Grooves 50 is shown in FIG. 7. A fiber 27 is inserted into a U-Groove 50 on a prior art photonic chip 26 shown in FIG. 8. When inserted there is an extremely tight tolerance and a stress concentration point at the groove entrance corners 28 of the prior art photonic chip 26 as shown in FIG. 8A. Another version of a prior art photonic chip 29 with V-Grooves 51 is shown in FIG. 9. A fiber 31 is inserted into a V-Groove 51 on a prior art photonic chip 30 in FIG. 10. When inserted there is an extremely tight tolerance and a stress concentration point at the groove entrance corners 32 shown in FIG. 10A. A photonic chip 33 with flared U-Grooves 53 in accordance with an embodiment of the disclosure is shown in FIG. 11. In this case, a fiber 35 is inserted into a flared U-Groove 53 of the photonic chip 34 as shown in FIG. 12. As shown in FIG. 12A, when the fiber 35 is inserted into the flared entrance 36 of the U-Groove 53 there is much more clearance as compared to the prior art, which reduces the chance for damage and a result no stress concentration point to reduce the chances of the fiber breaking. Another embodiment in accordance with the present disclosure is a photonic chip 37 with flared V-Grooves 54 as shown in FIG. 13. In this case, a fiber 39 is inserted into a flared U-Groove 54 of the photonic chip 38 as shown in FIG. 14. As shown in FIG. 14a, when the fiber 39 is inserted into the flared entrance 40 of the V-Groove 54 there is much more clearance as compared to the prior art, which reduces the chance for damage and a result no stress concentration point to reduce the chances of the fiber breaking. This example describes photonic chips noted above without recessed rims. However, this disclosure is also applicable to flared U-Groove chips 41 with recessed rims as shown in FIG. 15 and to flared V-Groove chips 42 with recessed rims as shown in FIG. 15A.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A method for attaching an optical fiber to a photonic chip, comprising:
bringing a plurality of optical fibers to an edge of a photonic chip comprising a plurality of separate single waveguides at a top surface of the photonic chip and each waveguide of the plurality of separate single waveguides intersecting a periphery the photonic chip and a rim recessed from the top surface around the entire periphery of the photonic chip, wherein the recessed rim comprises at least one geometric feature on the recessed rim separating each waveguide from at least one adjacent waveguide of the plurality of separate single waveguides, the at least one geometric feature configured to prevent adhesive flow along the recessed rim between adjacent waveguides;
aligning a first one of the plurality of optical fibers to a first one of the plurality of separate single waveguides; and
adhesively bonding the first one of the plurality of optical fibers to the photonic chip with adhesive, wherein adhesive flow along the recessed rim of the photonic chip is prevented by the at least one geometric feature from interfering with the attachment of a second one of the plurality of optical fibers to a second one of the plurality of separate single waveguides.

2. The method of claim 1, further comprising adhesively bonding the second one of the plurality of optical fibers to the photonic chip with adhesive, wherein adhesive flow along the recessed rim of the photonic chip is prevented from interfering with the attachment of a third one of the plurality of optical fibers to a third one of the plurality of separate single waveguides.

3. The method of claim 1, wherein the waveguide comprises an optical fiber groove disposed between the edge of the photonic chip and an optical waveguide.

4. The method of claim 1, wherein adhesively bonding comprises applying an optically curable adhesive and curing the adhesive.

5. A photonic chip comprising:
a plurality of separate single waveguides at a top surface of the photonic chip and each waveguide of the plurality of separate single waveguides intersecting a periphery the photonic chip; and
a rim recessed from the top surface around the entire periphery of the photonic chip, wherein the recessed rim comprises at least one geometric feature on the recessed rim separating each waveguide from at least one adjacent waveguide of the plurality of separate single waveguides, the at least one geometric feature configured to prevent adhesive flow along the recessed rim between adjacent waveguides.

6. The chip of claim 5, wherein the at least one geometric feature comprises a plurality of geometric features having varying width.

7. The chip of claim 5, wherein the at least one geometric feature comprises a plurality of geometric features having varying height.

8. The chip of claim 5, wherein the waveguide comprises an optical fiber groove disposed between the edge of the photonic chip and an optical waveguide.

9. The chip of claim 8, wherein the optical fiber groove is U-shaped or V-shaped.

10. The method of claim 1, further comprising:
inserting an end of an optical fiber of the plurality of optical fibers into an optical fiber groove of the photonic chip by guiding the end of the optical fiber into a flared opening of an entrance portion of the optical fiber groove, wherein the flared opening intersects a periphery of the photonic chip and has a greater clearance than a non-entrance portion at the other end of the optical fiber groove, thereby minimizing damage to at least one of the optical fiber and the photonic chip.

11. The method of claim 10, wherein inserting the end of the optical fiber into the optical fiber groove terminates at a waveguide of the photonic chip.

12. The method of claim 10, further comprising bonding the inserted optical fiber to the photonic chip by applying adhesive to the photonic chip.

13. The method of claim 12, wherein the bonding comprises applying an optically curable adhesive and optically curing the adhesive.

14. The method of claim 10, further comprising inserting an optical fiber array into a plurality of optical fiber grooves.

15. The chip of claim 5, further comprising:
at least one optical fiber groove which comprises an entrance portion which intersects a periphery of the photonic chip at one end of the at least one optical fiber groove and a non-entrance portion at the other end of the at least one optical fiber groove, wherein the entrance portion comprises a flared opening having a greater clearance than the non-entrance portion.

16. The chip of claim 15, wherein the geometry of the at least one optical fiber groove is V-shaped or U-shaped.

17. The chip of claim 15, wherein the non-entrance portion of the optical fiber groove terminates at a waveguide of the photonic chip.

* * * * *